Feb. 23, 1960     C. J. HOLTKAMP     2,926,233
ELECTRIC HEATER CONTROL APPARATUS
Filed Oct. 17, 1957
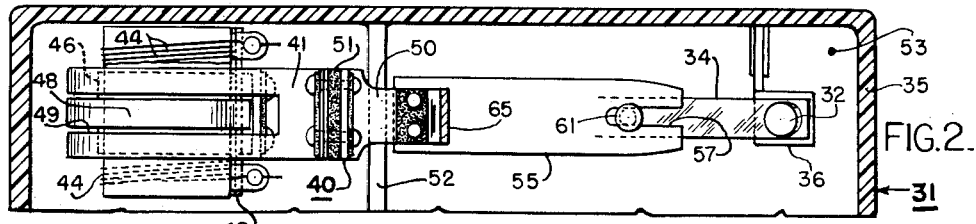
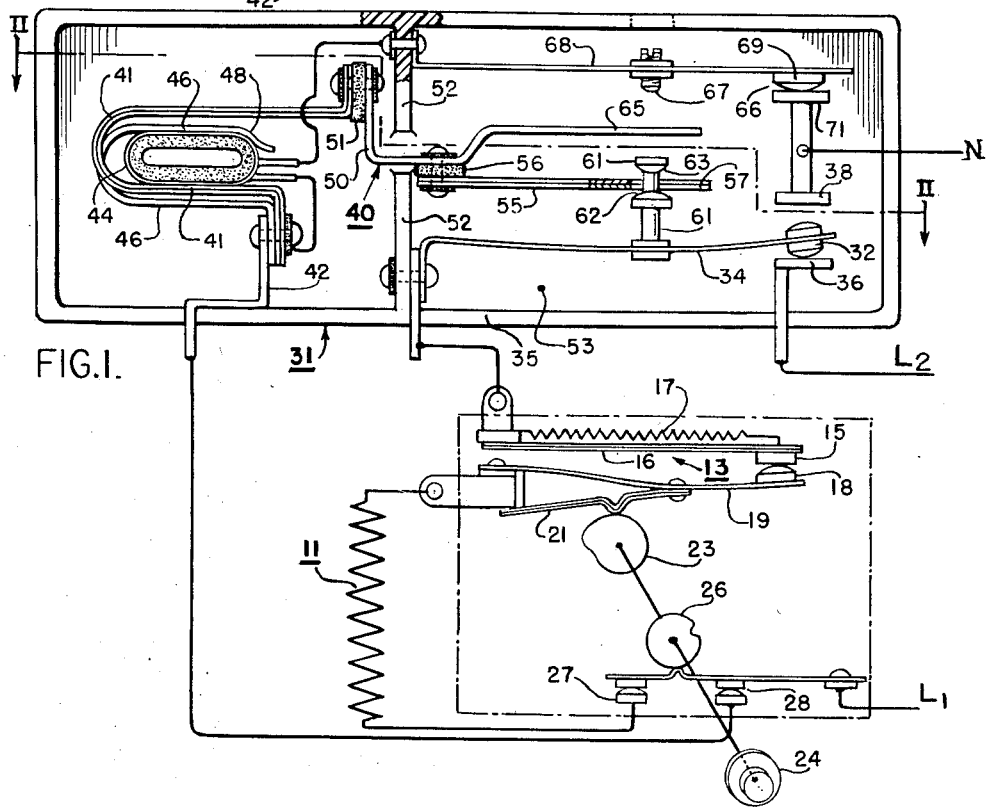
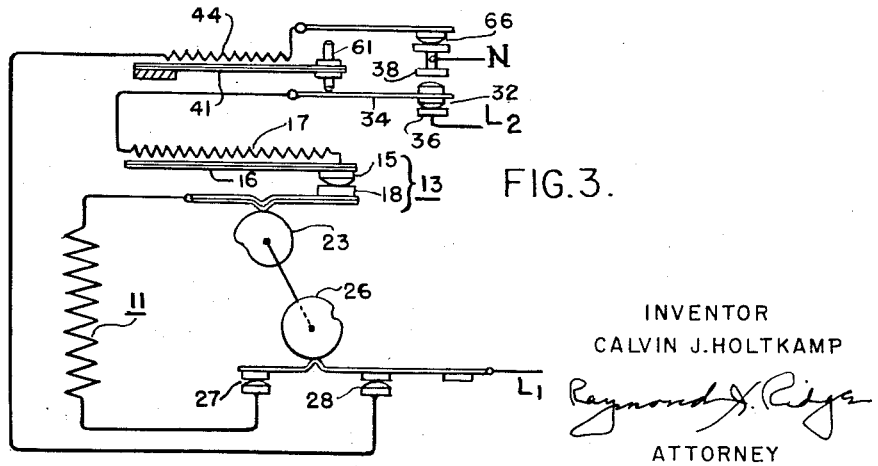
INVENTOR
CALVIN J. HOLTKAMP
ATTORNEY

United States Patent Office 2,926,233
Patented Feb. 23, 1960

2,926,233

ELECTRIC HEATER CONTROL APPARATUS

Calvin J. Holtkamp, Mansfield, Ohio, assignor to Westinghouse Electric Corporation, East Pittsburgh, Pa., a corporation of Pennsylvania Application October 17, 1957, Serial No. 690,809

3 Claims. (Cl. 219—20)

This invention relates to switch apparatus for providing a controlled period of over-energization of an electrical heater to quickly bring the heater to a desired operating temperature and for thereafter energizing the heater at a controlled reduced rate.

To control surface heating units on domestic electric ranges, it is often desired to provide a switching arrangement for "flashing" the heating unit or applying thereto a high voltage for a controlled period when the heater is turned on by the user, the voltage being above the rated value for the heater and of a magnitude that cannot be continuously applied to the heater without either damaging the heater or overheating the cooking utensils thereon. It is preferable that the period of flashing be adjustable so that the heater will be brought to approximately that temperature at which it will be operated thereafter.

Among the objects of this invention is to provide a heater control comprising a low cost flasher or voltage transfer switch having simplified operation in combination with a conventional thermally actuated, infinitely adjustable cycling switch.

Another object of this invention is to provide an improved flasher switch of the above type in which no mechanical connections between the flasher switch and the infinitely adjustable switch are required.

Another object of this invention is to provide an improved flasher switch for changing the energization voltage of a heater independently of the operation of an infinitely adjustable switch connected in series with the flasher switch and the heater without interrupting flashing current at the flasher switch contacts for each flashing operation.

Another object of this invention is to provide an improved system for changing the voltage applied to a heating unit from a flashing value to a lower rated value, the system including a cycling switch for controlling the duration of flashing as the heater is raised to a plurality of different temperatures and a switch for independently effecting such transfer during a period of deenergization of the heater.

In accordance with this invention, a novel flasher or voltage transfer switch is connected in series with a conventional thermally actuated, infinitely adjustable switch for controlling the energization of a main electrical heater. The flasher switch has a first position for flashing the heater at an over-voltage when a heating operation is initiated. For each of a plurality of selected heater outputs the cycling switch opens, before the flasher switch operates, to terminate the flashing period, which has a duration dependent upon manual adjustment of the cycling switch.

The transfer switch includes an electrically heated thermally responsive actuator that is heated upon initiation of the heating operation, but its heating is independent of the operation of the cycling switch.

The actuator is continuously heated until it moves the transfer switch from the flashing position and connects the heater for energization at rated voltage. The time interval between the start of the heating operation and this movement of the transfer switch is substantially constant regardless of the adjustments of the cycling switch. The movement of the transfer switch preferably occurs after the cycling switch opens to interrupt the flashing current and before the cycling switch recloses, regardless what period of flashing is selected. Thus, the cycling switch contacts may be used to interrupt the current during flashing and also control the period of flashing, but this cycling switch does not control the operation of the transfer switch.

The foregoing and other objects are effected by the invention as will be apparent from the following description and claims taken in connection with the accompanying drawings, forming a part of this application, in which:

Fig. 1 is a plan view of a voltage transfer switch and includes a schematic illustration of a thermal cycling switch and heater connected therewith;

Fig. 2 is a section taken on line II—II of Fig. 1; and

Fig. 3 is a simplified schematic circuit of the apparatus of Fig. 1.

In the schematic circuits of Figs. 1 and 3, a main electrical heater 11, which may be of the type used in surface heating units on electric ranges, is connected in series with a manually adjustable current responsive cycling switch 13 and a transfer switch mechanism 31.

The cycling switch 13 comprises a cycling contact 15 carried by a thermally responsive bimetal member 16 that is fixed at one end and has an electrical heater 17 connected in series with the contacts of switch 13. The other contact 18 of the switch 13 is carried on one end of a resilient electrically conducting strip 19 having its other end fixed. The contact 18 is adjustably positioned by means of an ambient temperature compensating bimetallic member 21 connected to the strip 19 and biased thereby into engagement with the surface of a cam 23 that is manually adjustable to any of a plurality of active stations by a knob 24. The bimetal member 16 separates the cycling contact 15 from the contact 18 in response to being heated by the current flowing through the switch 13. Thereafter, upon cooling, the bimetal 16 recloses switch 13.

Another cam 26, connected for operation by the knob 24, actuates a pair of line switches 27 and 28 to close positions in all active stations of the knob and opens these switches in one knob position, referred to as the "off" position, for deenergizing the entire heater and control circuit. The switch 27 is connected to control the energization of the main heater 11, whereas, the switch 28 controls the operation of the transfer switch mechanism 31 described hereinafter.

The voltage at which the main heater 11 is energized is determined by the position of a movable contact 32 supported on an electrically conducting spring arm 34 carried by an electrically insulating base or casing 35 of the voltage transfer switch 31. In one position, the contact 32 engages a first stationary contact 36 on the base 35 to connect the main heater 11 in series with heater 17 and switches 13 and 27 across 230 volts between conductors $L_1$ and $L_2$ of a conventional Edison three-wire power source. The movable contact 32 may be shifted to a second position to engage a second stationary contact 38 on the base 35 for connecting the circuit of heater 11 at 115 volts between conductor $L_1$ and the neutral N of the power source.

The movable contact 32 is biased toward the stationary contact 38 by means of the spring arm 34, but is held in engagement with the first stationary contact 36 by means of a thermomotive actuator 40. The actuator comprises a U-shaped bimetal strip 41 having one end secured to a terminal 42 on the base and arranged so that the opposite sides of the U-shaped bimetal structure are separated in response to heating of the latter, moving the free end of the bimetal 41 upwardly as seen in Fig. 1.

An electrical heater 44 is disposed within the U-shaped bimetal member 41 and has a flat side held in good heat transfer relationship against one side of the bimetal strip 41 by means of a finger portion 48 of a U-shaped metal spring 46. The spring 46 is connected at its fixed end to bimetal 41 at terminal 42, as seen in Fig. 1, and extends along the side of the bimetal engaged by the heater 44. The spring finger 48 is reversely bent to extend through a slot 49 in the bight of the bimetal 41 and engages the upper surface of the heater, biasing the latter downwardly against the bimetal with a light force so as not to noticeably affect the deflection of the main bimetal 41 in response to heating. The force of the heater urges the lower side of the bimetal 41 in the same direction that the latter moves when heated. The heater 44 may comprise an electrical resistance wire wound on a ceramic base and provided with an electrically insulating heat resistant coating, such heaters being well known.

The free or deflectible end of the bimetallic strip 41 supports a metal bracket 50, secured thereto as by riveting, with a member 51 of poor heat conduction therebetween. The bracket 50 projects through an opening in a wall or partition 52 on the base into a compartment 53 which encloses the various contacts of the transfer switch 31. Secured to the metal bracket 50 within the compartment 53 is an ambient temperature compensating bimetal strip 55, also fastened as by riveting, with a poor heat conducting member 56 separating it from the bracket. The bimetal 55 extends generally parallel to the spring arm 34 and has a slot 57 at its free end for receiving an electrically insulating pin member 61 attached to the spring arm. The free or slotted end of the compensating bimetal 55 tends to deflect downwardly when the temperature of the bimetal rises and upwardly on cooling. When the main bimetal 41 is cool or at room temperature, the compensating bimetal 55 engages a shoulder 62 on the pin member to act against the bias of the spring arm 34 and hold the movable contact 32 in engagement with the first stationary contact 36.

The end of the main bimetal 41 connected to the metal bracket 50 is deflectible in response to being heated by the heater 44 to move bracket 50 and compensating bimetal 55 upwardly, as seen in Fig. 1. The pin member 61 follows the upward movement of the compensating bimetal 55 due to the upward bias of the spring arm 34 and, after the free end of the bimetal 55 moves sufficiently upwards, the movable contact 32 is separated from the stationary contact 36.

Separation of the contacts 32 and 36 preferably should occur after the switch 13 opens, as will be described hereinafter, so that the contacts 32 and 36 are not required to interrupt the large currents occurring during flashing. In the event that the contacts adhere preventing desired switch operation, the compensating bimetal will be moved upwardly relative the pin member to engage an upper shoulder 63 thereon and further movement of the bimetal 55 pulls the contacts 32 and 36 apart. Preferably, the distance between the shoulders 62 and 63 on the pin member 61 is short enough to prevent the movable contact 32 from snapping over into engagement with the stationary contact 38 when pulled free of the contact 36. This prevents the establishment of an arc between the stationary contacts 36 and 38 in the event the infinite switch is closed at the time the transfer switch is actuated.

During the usual operation of the transfer switch, the heater 44 remains energized after contacts 32 and 36 open. There is a period of perhaps ten seconds after these contacts separate during which the movable contact 32 moves upwardly without engaging either of the stationary contacts 36 and 38. At the end of this interval, the movable contact 32 engages the stationary contact 38. Thereafter, the main bimetal 41, while still being heated by heater 44, deflects further to move the bracket 50 and the compensating bimetal 55 relative shoulder 62 on the pin member 61 until an extension 65 of the bracket 50 opens a switch 66 comprising contacts 69 and 71 controlling the heater 44. The bracket extension 65 engages an adjusting screw 67 on an electrically conducting spring arm 68 to actuate the latter and movable contact 69, thereon, out of engagement with stationary contact 71 connected to contact 38 and the neutral conductor N. The switch 66 is connected in series with the heater 44 to prevent the main bimetal 41 from being overheated after the movable contact 32 engages the stationary contact 38. The main bimetal 41 cools in response to the opening of the switch 66 and is again reheated when the switch closes. Thus, the main bimetal 41 cyclically operates the safety switch 66 without affecting the position of the movable contact 32, due to the lost motion connection between the pin member 61 and the compensating bimetal 55.

The travel and rate of deflection of the bimetal strip 41 are selected so that the time interval between initial energization of the heater 44 and separation of the contacts 32 and 36 is approximately 25 seconds and is greater than the maximum interval of time required for the cycling contacts of the infinite switch 13 to separate after initial energization of the heater 17 on the first cycle of operation of this switch. In the illustrated embodiment of the invention, this maximum interval occurs at the high heat setting where the highest point of the cam 23 is in engagement with the bimetal 21 to provide maximum percentage of closed time of switch 13 during its cycling operation. The time interval for operation of the transfer switch to open contacts 32 and 36 preferably should also be less than the shortest total period of closed and open time of switch 13 during its first cycle, so that the contacts 32 and 36 separate before the switch 13 recloses. This shortest total period also occurs when the highest point of cam 23 engages the bimetal 21.

In a typical infinitely adjustable switch that is thermally cycled, it has been found that, when the switch is adjusted to provide high heat output after flashing, but is connected to carry increased current during flashing, the initial closed contact period of the switch during over-energization of the heater may be in the order of 18 to 22 seconds. This closed contact period is followed by an open contact period in the order of 13 to 17 seconds. When the switch is adjusted to provide low heat output after flashing, but is still connected to carry flashing current, the initial closed contact time may be about 6 to 8 seconds followed by an open contact period of about 40 to 60 seconds. The cycling switch 13 is designed to track the heating and cooling of the main surface unit heater and from the above figures it can be seen that, if the opening of the flashing connections of the transfer switch is delayed until after the end of the longest initial "on" period of the cycling switch, the latter can be made to do all of the interrupting of the flashing current and the transfer switch 31 may open the flashing circuit under a no load condition. Thus, the duration of the flashing period is actually timed by the cycling switch 13, since the initial closed contact time of the latter varies with changes in the settings of the cam 23 to provide different rates of energization of the main heater during cycling of the latter after the flashing period.

In some instances of operation of the transfer switch 31, the movable contact 32 may close upon the stationary contact 38 after reclosure of the cycling switch 13. This does not matter, however, as far as the operation of the system shown in Figs. 1 and 3 is concerned.

*Operation*

To initiate a flashing operation, the user manipulates the knob 24 from the "off" position to a position in which indicia (not shown) on the knob indicates a desired level of heat output from the main heater. The switches 27 and 28, which are open in the "off" position, are closed by this manipulation and the cam 23 is thus adjusted to select a predetermined cycling operation of the cycling switch. The closure of the switch 28 completes a circuit from conductor $L_1$ of the power source through the transfer switch heater 44 and the over-heat protecting switch 66 to the neutral conductor N. Closure of switch 27 completes a heater flashing circuit from conductor $L_1$ through the main heater 11, the cycling switch 13, to the contact arm 34 and through contacts 32 and 36 of the transfer switch 31 to conductor $L_2$. Thus, both the bimetal 16 and the bimetal 41 are simultaneously heated by their respective heaters, and, after a period determined by the adjustment of the cam 23, the bimetal 16 separates the contacts of the cycling switch 13 to interrupt the flashing circuit for the main heater between conductors $L_1$ and $L_2$. The bimetal heater 44 remains energized to effect further heating of the bimetal strip 41 and at a time during the open period of the contacts of the cycling switch 13, the movable contact 32 is separated, as described previously, from the stationary contact 36. The bimetal strip 41 is heated to deflect further and shift the movable contact 32 into engagement with the stationary contact 38. Thereafter, closure of the cycling switch 13 connects the upper end of the heater, as shown in Figs. 1 and 3, to the neutral conductor N for energization of the heater at a reduced or rated voltage between conductors N and $L_1$.

To terminate a heating operation, the control knob 24 is adjusted to "off" and the line switches 27 and 28 will be opened. The opening of switch 28 allows the bimetal 41 to cool and return the movable contact 32 into engagement with contact 36, thus resetting the transfer switch so the heater may be flashed during a subsequent heating operation.

Although it is preferable that the cycling switch 13 be used to interrupt the flashing current to the heater 11, the same control function described above may be obtained by designing the thermal actuator of the transfer switch 31 so that contacts 32 and 36 separate after opening of the switch 13 for all adjusted positions of the latter switch except the high position. This high position, as previously mentioned, establishes the maximum closed period of the switch 13 during its first cycle of operation. By designing the switch 31 to have the contacts 32 and 36 separate just prior to opening of switch 13 with the latter at the high or upper range of temperature adjustment, the contacts 32 and 36 will control flashing for the high position, but switch 13 would still open before contacts 32 and 36 to control shorter periods of flashing when the control knob 24 is adjusted for heating operations below the high setting.

The cycling switch 13 and the transfer switch 31 may be designed or calibrated to the same flashing period for the high position of switch 13, which is perhaps the most important setting since it determines the maximum heater temperature. If this is done in a production run of controls, some controls will have the cycling switch opening first and others will have the transfer switch opening first due to minor manufacturing variables.

It is obvious that if the transfer switch 31 is permitted to control the duration of flashing at more than one setting of the cycling switch 13, the flashing period for each such setting will be the same. Such an arrangement is possible, but it is preferable to have a different flashing period for each adjustment of the cycling switch 13.

The interval of time required for the opening of the contacts 32 and 36 of the transfer switch remains substantially constant and is independent of operation of the cycling switch 13, which may be adjusted by means of the cam 23 and control knob 24 to any setting, from low to high, to time the duration of the over-energization period and to subsequently control the heater at a desired rate of energization.

The transfer switch 31 as shown and described may be located remote from the main heater 11 and the cycling switch 13, as there are no mechanical linkages connecting it with either of these parts of the system. The transfer switch 31 may easily be added as an accessory to a range surface unit already provided with a conventional cycling switch of the thermally actuated type as indicated in Fig. 1.

While the invention has been shown in but one form, it will be obvious to those skilled in the art that it is not so limited, but is susceptible of various changes and modifications without departing from the spirit thereof.

What is claimed is:

1. A control for an electric heater comprising a cycling switch and a transfer switch, said switches being connected in series to control the energization of said heater, an electrically heated thermally responsive bimetal strip for actuating said cycling switch to open and closed positions upon heating and cooling of the strip under control of said cycling switch, manual adjusting means movable to a plurality of active stations for adjusting said cycling switch to select the duration of the first period of energization of said heater and select the percentage of closed time of the cycling switch for subsequent cycling thereof during a heating operation, said transfer switch having a first position for connecting said heater to provide a first level of heat output during said first period and being movable to a second position during the heating operation for thereafter connecting said heater for reduced heat output, means including a second electrically heated bimetal strip for actuating said transfer switch from its first position to its second position upon heating the second bimetal strip, means responsive to movement of said adjusting means to any of said active stations for initiating the heating of said bimetal strips and said heater to start the heating operation, the operation of said second bimetal strip during heating thereof being such, when said adjusting means assumes any of said active stations, that said transfer switch is moved from its first position after said cycling switch opens to terminate the first period of heater energization, but before reclosure of the cycling switch.

2. Electrical heating apparatus comprising an electrical resistance heater, a cycling switch connected in series with said heater, a transfer switch, connected in series with said heater and said cycling switch, for initially connecting said heater to a power source to provide high heat output and subsequently connecting the heater for a reduced level of energization, a bimetal member arranged to open said cycling switch upon being heated, electrical heating means for said bimetal member connected for control by said cycling switch, manual adjusting means for initiating energization of said heater and selecting the percentage of closed time of said switch during its cycling operation, said cycling switch having a period of closed time during the first period of energization of said heater that is dependent upon the setting of said manually adjustable means, said transfer switch comprising a thermally-responsive actuator and electrical heating means therefor for actuating said switch, switch means for energizing said heating means in response to adjustment of said manually adjusting means to energize said heater, the rate of movement of said thermally-responsive actuator in response to heating by its heating means being such that during the initial cycle of said cycling switch the transfer switch is actuated after said cycling switch opens and before the latter recloses to connect the heater for reduced energization thereafter.

3. Electrical heating apparatus comprising an electrical resistance heater, a thermal cycling switch connected in series with said heater, a transfer switch having first and second positions for energizing said heater at a first higher voltage and a second lower voltage, respectively, said transfer switch being connected in series with said heater and said cycling switch, manually adjustable means having a plurality of active stations for adjusting the cycling operation of said cycling switch, the adjustment of said adjustable means to one of said stations providing a maximum closed time and a minimum open time of said cycling switch contacts during its first cycle of operation, the adjustment of said adjustable means to each of the others of said stations providing during the first cycle of operation of the cycling switch a shorter closed time, but a greater total closed and open time, than for said one station, a thermally responsive actuator for said transfer switch, an electrical heater for said actuator, means for energizing the heater for said actuator and initiating operation of said cycling switch when said adjusting means is adjusted to any of said active stations to commence a heating operation, said actuator being so constructed and arranged as to cause said transfer switch to move from its first position after said cycling contacts initially separate and before they reclose during the heating operation, the period of time required for heating of said actuator to cause the transfer switch to move from its first position being substantially constant and independent of variations in operation of said cycling switch due to adjustment of said manually adjusting means to different active stations.

References Cited in the file of this patent

UNITED STATES PATENTS

| | | |
|---|---|---|
| 2,197,230 | Waddell | Apr. 16, 1940 |
| 2,422,526 | Burch | June 17, 1947 |
| 2,675,455 | Richardson | Apr. 13, 1954 |
| 2,747,073 | Welch et al. | May 22, 1956 |
| 2,790,057 | Schauer | Apr. 23, 1957 |
| 2,798,929 | Wojcik | July 9, 1957 |
| 2,813,172 | Wojcik | Nov. 12, 1957 |
| 2,813,173 | Risacher et al. | Nov. 12, 1957 |